United States Patent
Nath et al.

(10) Patent No.: US 7,996,906 B2
(45) Date of Patent: *Aug. 9, 2011

(54) SYSTEM AND METHOD FOR AUTOMATICALLY ALTERING DEVICE FUNCTIONALITY

(75) Inventors: Badri Nath, Edison, NJ (US); Rakesh Kushwaha, Marlboro, NJ (US); Mark Edwards, Westfield, NJ (US)

(73) Assignee: Mformation Technologies, Inc., Edison, NJ (US)

( * ) Notice: Subject to any disclaimer, the term of this patent is extended or adjusted under 35 U.S.C. 154(b) by 1 day.

This patent is subject to a terminal disclaimer.

(21) Appl. No.: 12/613,641

(22) Filed: Nov. 6, 2009

(65) Prior Publication Data

US 2010/0069040 A1    Mar. 18, 2010

Related U.S. Application Data

(63) Continuation of application No. 11/495,004, filed on Jul. 27, 2006, now Pat. No. 7,702,632.

(60) Provisional application No. 60/704,110, filed on Jul. 28, 2005.

(51) Int. Cl.
    *G06F 12/14* (2006.01)
(52) U.S. Cl. ............... 726/24; 455/410; 455/418
(58) Field of Classification Search ............ 726/23, 726/24; 455/410, 418
    See application file for complete search history.

(56) References Cited

U.S. PATENT DOCUMENTS

| | | | |
|---|---|---|---|
| 5,182,811 | A | 1/1993 | Sakamura |
| 5,694,451 | A | 12/1997 | Arinell |
| 5,774,377 | A | 6/1998 | Eidson et al. |
| 5,896,526 | A | 4/1999 | Savkar et al. |
| 6,076,113 | A | 6/2000 | Ramanathan et al. |
| 6,088,588 | A | 7/2000 | Osborne |
| 6,097,953 | A | 8/2000 | Bonta et al. |
| 6,182,157 | B1 | 1/2001 | Schlener et al. |
| 6,208,853 | B1 | 3/2001 | LoVasco et al. |
| 6,263,388 | B1 | 7/2001 | Cromer et al. |
| 6,298,445 | B1 | 10/2001 | Shostack et al. |
| 6,343,213 | B1 * | 1/2002 | Steer et al. ............ 455/411 |

(Continued)

FOREIGN PATENT DOCUMENTS

AU    774777 B2    8/2001

(Continued)

OTHER PUBLICATIONS

Alessandro Rubini, "Linux Device Drivers", Feb. 15, 1998, Section 9, Interrupt Handling, O'Reilly Media, Inc., Sebastopol, CA.

(Continued)

*Primary Examiner* — Kambiz Zand
*Assistant Examiner* — Amare Tabor
(74) *Attorney, Agent, or Firm* — Lando & Anastasi, LLP

(57) ABSTRACT

A system and method for automatically altering device functionality based on the occurrence of certain predetermined conditions. A link may be established between a device and a trusted server to provide an association between various conditions that may be detected at the device and actions that are to be taken on the device. In particular, software traps can be set up and linked to device functionality such that execution of the trap may automatically disable or enable certain device capabilities. Some aspects of the invention are directed to a system and method for remotely setting software traps for detecting software viruses and, upon execution of the traps, several methods for establishing a quarantine on infected devices.

13 Claims, 3 Drawing Sheets

U.S. PATENT DOCUMENTS

| | | |
|---|---|---|
| 6,466,804 B1 | 10/2002 | Pecen et al. |
| 6,577,628 B1 | 6/2003 | Hejza |
| 6,662,023 B1 | 12/2003 | Helle |
| 6,675,002 B1 | 1/2004 | Lipovski |
| 6,741,595 B2 | 5/2004 | Maher, III et al. |
| 6,842,861 B1 | 1/2005 | Cox et al. |
| 6,876,951 B2 | 4/2005 | Skidmore et al. |
| 6,879,813 B2 | 4/2005 | Reznik |
| 6,970,724 B2 * | 11/2005 | Leung .................... 455/567 |
| 7,003,264 B2 | 2/2006 | Fodor et al. |
| 7,043,254 B2 | 5/2006 | Chawla et al. |
| 7,076,252 B1 | 7/2006 | Hirvonen |
| 7,184,554 B2 | 2/2007 | Freese |
| 7,240,110 B2 | 7/2007 | Haitsuka et al. |
| 7,386,299 B2 * | 6/2008 | Nakamura .................... 455/411 |
| 7,437,168 B1 | 10/2008 | Westfield |
| 2002/0040450 A1 | 4/2002 | Harris et al. |
| 2002/0069037 A1 | 6/2002 | Hendrickson et al. |
| 2002/0069259 A1 | 6/2002 | Kushwaha et al. |
| 2002/0094799 A1 | 7/2002 | Elliott et al. |
| 2002/0112047 A1 | 8/2002 | Kushwaha et al. |
| 2002/0178385 A1 | 11/2002 | Dent et al. |
| 2003/0023857 A1 | 1/2003 | Hinchliffe et al. |
| 2003/0061009 A1 | 3/2003 | Davis et al. |
| 2003/0208577 A1 | 11/2003 | Grigsby |
| 2004/0042604 A1 | 3/2004 | Hiltunen et al. |
| 2004/0058652 A1 | 3/2004 | McGregor et al. |
| 2004/0176040 A1 | 9/2004 | Thornton et al. |
| 2004/0204089 A1 | 10/2004 | Castrogiovanni et al. |
| 2004/0207422 A1 | 10/2004 | Lehtinen et al. |
| 2005/0059354 A1 | 3/2005 | Zhao et al. |
| 2005/0060364 A1 | 3/2005 | Kushwaha et al. |
| 2005/0091553 A1 | 4/2005 | Chien et al. |
| 2005/0268118 A1 | 12/2005 | Zebelloni et al. |
| 2006/0015780 A1 | 1/2006 | Fong |
| 2006/0041652 A1 | 2/2006 | Cowham |
| 2006/0146713 A1 | 7/2006 | Makowski et al. |
| 2007/0026854 A1 | 2/2007 | Nath et al. |
| 2007/0030539 A1 * | 2/2007 | Nath et al. .................... 358/520 |

FOREIGN PATENT DOCUMENTS

| | | |
|---|---|---|
| EP | 1355251 A2 | 10/2003 |
| EP | 1507425 A1 | 2/2005 |

OTHER PUBLICATIONS

European Search Report in corresponding European Patent Application No. 06824789.9 dated Jun. 8, 2009.

Examination Report in corresponding European Patent Application No. 06824789.9 dated Jul. 1, 2009.

International Search Report and Written Opinion in corresponding International Application No. PCT/US06/29399 dated Jul. 21, 2008.

Yuji Fukunaga, "Helping Tool for NT Network Operation," Interop Magazine, Mar. 1, 2000, pp. 103-113, vol. 10, No. 3.

Shinobu O'Hara, "Operation and Management Tool for Personal Computer LAN Successively Appearing on the Market," Nikkei Open System, Oct. 10, 1994, pp. 182-195, No. 19.

\* cited by examiner

SYSTEM AND METHOD FOR AUTOMATICALLY ALTERING DEVICE FUNCTIONALITY

RELATED APPLICATIONS

This application is a continuation, under 35 U.S.C. §120, of U.S. application Ser. No. 11/495,004 filed Jul. 27, 2006, now allowed, which claims the benefit under 35 U.S.C. §119(e) of the earlier filing date of U.S. Provisional Patent Application No. 60/704,110 filed Jul. 28, 2005 and entitled "SYSTEM AND METHOD TO ESTABLISH QUARANTINE ON WIRELESS DATA TERMINALS USING ANTI-VIRUS MANAGEMENT SOFTWARE," each of which is herein incorporated by reference in its entirety.

BACKGROUND

1. Field of Invention

The present invention relates to network devices and, more particularly, to devices that may receive commands from a network server that affect the functionality of the devices.

2. Discussion of Related Art

Wireless devices, such as cell phones, pagers, personal digital assistants (PDAs), PCMCIA devices, personal computers, and the like, provide an environment for deploying and executing various voice, data, and/or voice and data applications. Many of these devices have a number of capabilities or functions. For example, Second and a half Generation (2.5G) wireless devices and networks permit a single wireless device to communicate voice and text messages, as well as permitting users to access web services using a packet-based network. Third Generation (3G) wireless devices add to such capabilities by providing high bandwidth packet-based communications.

A wireless device may accept inputs from a number of interfaces and may provide outputs on one or more interfaces. These device interfaces may be turned on and off provided there is a hardware or software interface to do so. For example, a user may manually switch off a cell phone, or switch it to "silent mode." In another example, a camera or Bluetooth link on a wireless device can be turned off by means of a hardware switch and/or software interface. Such alteration of device capability is in general controlled by a user of the device.

Software viruses are programs that attach to other programs so as to damage, corrupt or destroy data on devices. A defense mechanism exists against these viruses in the form of anti-virus software that can detect virus programs and prevent them from ever executing. However, counter-measures provided by existing anti-virus software cannot effectively quarantine a device that has infected programs or data.

SUMMARY OF INVENTION

Situations may often dictate where device capability needs to be, or may preferably be, automatically altered in response to certain conditions. For example, it may be desirable to quarantine a device (i.e., prohibit or limit access to the device) when a virus is detected to prevent damage to data stored on the device. It may also be desirable to quarantine a device if spyware (i.e., a program that has the capability to share information stored on the device unbeknownst to and unauthorized by the device owner) is detected on the device, to prevent unauthorized access to private data that may be stored on the device. In another example, an enterprise or service provider may want certain device functionality (e.g., a camera or music player on a device) to be turned off when the device is operating in certain locations or during certain times. Accordingly, aspects and embodiments of the invention are directed to a system and method whereby a link may be established between a device and a trusted server to allow the trusted server to automatically alter device functionality in response to various conditions. In particular, some aspects of the invention are directed to a system and method for remotely setting software traps for detecting software viruses and, upon execution of the traps, establishing a quarantine on infected devices using a variety of methods. It is to be appreciated that the term "trap" as used herein refers to a software interrupt which when triggered transfers control of at least some device functionality to a specific software module.

According to one embodiment, a method of automatically altering functionality of a device in response to occurrence of a condition may comprise installing a trap adapted to execute in response to the occurrence of the condition, linking the functionality of the device to the trap, and altering the functionality of the device in response to execution of the trap. In one example, altering the functionality of the device may include disabling access to at least one hardware resource of the device. The method may further include receiving a link command that specifies the condition and the functionality of the device to be altered in response to the execution of the trap. In addition, the method may include authenticating the link command to verify that the link command comes from a trusted source. This may be done, for example, by comparing a signature accompanying the link command with a stored signature corresponding to a trusted source. In one example, the method may further comprise determining an identity of a device software module capable of altering the functionality of the device, and linking the identity of the device software module to an identity of trap. In another example, occurrence of the condition may include detection of a virus on the device, and altering the functionality of the device may include establishing a quarantine on the device. Establishing this quarantine may include at least one of disabling inputs to the device, isolating infected programs on the device and scrubbing device software.

According to another embodiment, a system for automatically altering specified functionality of a device in response to occurrence of a condition may comprise a device agent, at least one device software module capable of altering the specified functionality of the device, and a software trap adapted to execute in response to occurrence of the condition, wherein the device agent is constructed and arranged to link the at least one software module to the trap. In one example, the specified functionality of the device may include access to at least one hardware resource of the device, such as, for example, a keyboard, speaker phone, wireless connection, etc. In one embodiment, the device agent may be constructed and arranged to receive a link command that identifies the condition and the specified functionality of the device to be altered in response to occurrence of the condition. This link command may be supplied by a trusted a management server. In one example, the system may include anti-virus software installed on the device. In this case, occurrence of the condition may include detection of a virus by the anti-virus software. The device agent may be constructed and arranged to send a message to the management server upon execution of the trap in response to the detection of the virus to indicate to the management server which device software has been infected by the virus.

In another embodiment, there is provided a system for automatically altering specified functionality of a device in response to occurrence of a condition. The system may comprise a software trap installed on the device and adapted to execute in response to the occurrence of the condition, means for linking the functionality of the device to the trap, and means for altering the functionality of the device in response to execution of the trap.

According to another embodiment, a system for automatically altering specified functionality of a device in response to occurrence of a condition may comprise a device agent, at least one device software module capable of altering the specified functionality of the device, a software trap adapted to execute in response to occurrence of the condition, and a management server. The management server may be constructed and arranged to supply a link command to the device agent, wherein the link command identifies the condition and the specified functionality of the device to be altered in response to occurrence of the condition. The device agent may be constructed and arranged to link the at least one software module to the trap based on the link command.

BRIEF DESCRIPTION OF THE DRAWINGS

Various aspects and embodiments of the invention are discussed below with reference to the accompanying drawings. These drawings are not intended to be drawn to scale. In the drawings, each identical or nearly identical component that is illustrated in various figures is represented by a like reference numeral. For purposes of clarity, not every component may be labeled in every drawing. In the drawings.

DETAILED DESCRIPTION

Figure 1:
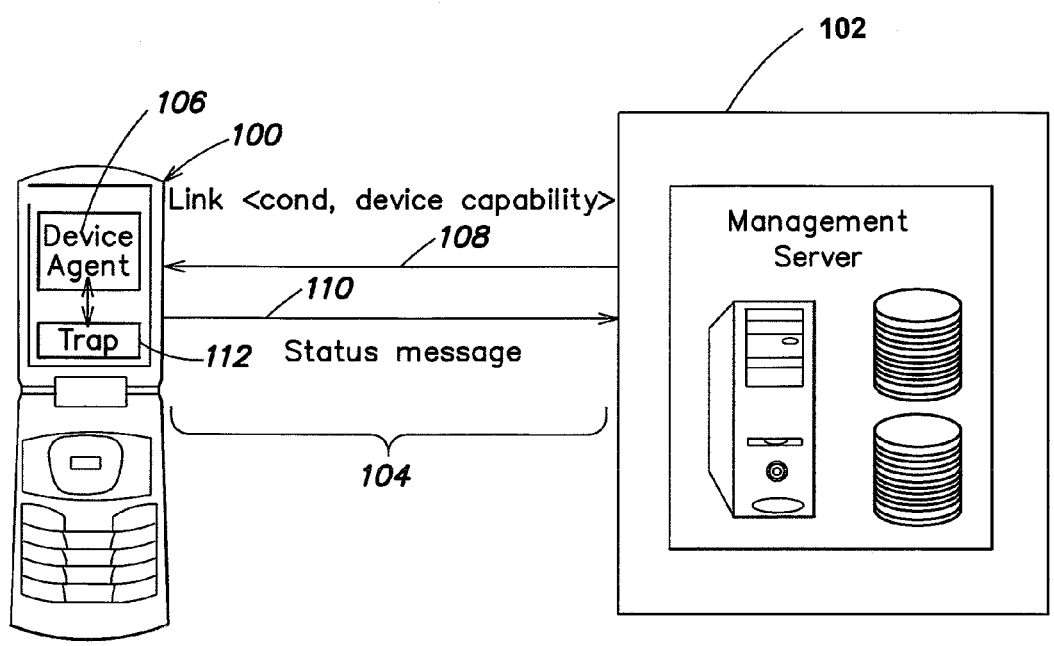
FIG. 1 is a block diagram of one example of a system according to an embodiment of the invention.

There are many instances in which it may be desirable to prevent a device from using some or all of its capability. For example, on airplanes it may be desirable to turn electronic devices off to avoid interference with various aircraft systems etc. In another example, during the presentation of a movie in a movie theatre, it may be desirable to prevent a cellular telephone ("cell phone") from ringing so as not to disturb other patrons. Although there have been attempts to allow movie theatres to transmit "blocking" signals to "jam" cell phones, such methods are unreliable and have met with regulatory obstacles. Thus, as discussed above, conventionally, one must rely on the operator of a device to turn it off manually or alter its capability (e.g., switching a cell phone off or to silent mode) in such circumstances. In another example, many government buildings (e.g., court houses) and other buildings prohibit the use of cameras inside the building or certain areas of the building and therefore, tend to confiscate cell phones with camera capability because the cell phone users cannot be relied upon not to use the camera inside the building.

It may be desirable to provide a system and method whereby device functionality can be altered automatically, without necessarily relying on the device user. Such a system and method may be more reliable and secure than traditional methods that rely on the user to alter device capability. In addition, it may be desirable to quarantine a device (i.e., prohibit or limit access to the device) when a virus is detected to prevent damage to data stored on the device. Existing anti-virus software cannot effectively implement such a quarantine because existing anti-virus software can generally only detect viruses, and sometimes report virus detection to a user or service provider, but cannot alter device functionality. Therefore, to address such limitations, embodiments of the invention and aspects thereof, relate to a system and method for automatically altering device functionality based on the occurrence of various events or conditions. Some aspects of the invention may be directed to providing counter-measures against devices infected with a virus, including establishing a quarantine on an infected device, providing remote downloading of anti-virus software, and configuring and updating virus defense management on devices, as discussed below.

It is to be appreciated that the invention is not limited in its application to the details of construction and the arrangement of components set forth in the following description or illustrated in the drawings. The invention is capable of other embodiments and of being practiced or of being carried out in various ways. Examples of specific implementations are provided herein for illustrative purposes only and are not intended to be limiting. In particular, acts, elements and features discussed in connection with one embodiment are not intended to be excluded from a similar role in other embodiments. Also, the phraseology and terminology used herein is for the purpose of description and should not be regarded as limiting. The use of "including," "comprising," "having," "containing," or "involving," and variations thereof herein is meant to encompass the items listed thereafter and equivalents thereof as well as additional items.

In broad overview, embodiments of the present invention relate to a system and method for automatically altering device functionality based on the execution of previously set "traps." As used herein, the term "trap" refers to a software interrupt which, when triggered, transfers control of at least some device functionality to a specific software module. It is to be appreciated that the term "device" as used herein refers to any electronic device that is capable of communicating with another electronic device over a network. Examples of devices include, but are not limited to, cell phones, personal digital assistants (PDAs), MP3 players or other music and/or video players, personal computers (e.g., laptops), etc. According to some aspects of the invention, trap management software may be integrated with device functionality such that execution of a trap automatically may alter that device functionality that has been linked to the trap, as discussed further below. It is to be appreciated that device functionality or capability, as used herein, is intended to refer to the ability of the device to access software or hardware resources such as a keypad, screen, camera, Bluetooth components, local or wide-area wireless network connections, Infrared ports, USB ports, storage devices (both removable and non-removable), processors, and any interfaces to access peripheral devices such as printers etc.

In many circumstances, conditions under which a device capability may preferably be altered may be specified by entities outside of the device. Such entities may include an owner or operator of the device, enterprises, or service providers. In accordance with an aspect of the invention, device capability may be linked to conditions that may be detected on the device. Some examples of such conditions may include, but are not limited to, the device entering a specific geographic location (e.g., the known location of a particular government building) or type or location (e.g., an airplane or movie theatre), a virus being detected on the device, a service provider wishing to add or remove device features or functions (e.g., based on a user's subscription plan), and many other conditions. These conditions may be programmed onto devices by way of traps and linked to software that can alter the capability of a device upon execution of the trap, as discussed further below.

It is to be appreciated that there are many methods by which conditions may be detected on the device, as known to those skilled in the art. For example, the device may include a clock to allow detection of time-based conditions to prevent certain device functionality during certain hours of the day or night. In another example, the device may include a position locator, such as GPS (global positioning system) unit that may allow detection of location-based conditions. Alternatively, the device may receive a signal that indicates that a condition has occurred. For example, a system located at an entrance to a facility may send a signal to the device indicating that, for example, cameras are prohibited or that cell phones, or their ringers, must be turned off. It is to be appreciated that the invention is not limited to any specific method of condition detection. It is only important that the device may detect a condition so as to trigger a previously set trap.

In one embodiment, the trap management software may include a "device agent" that may set up links between trap execution and device capability. It is to be appreciated that the term "device agent" as used herein refers to a software program capable of interfacing with programs that control device functionality so as to disable and/or re-enable device functionality based on commands from the management server. In one embodiment, the device agent may be installed on the device itself. This installation may be accomplished in numerous ways. In one example, the device agent may be installed when a new device is initiated either at the factory or by a service provider prior to being sold to a customer. Alternatively, the device agent may be installed on a device by downloading the device agent at any time during the usable life of the device.

In another embodiment, the device agent may be installed on an Identity Module attached to the device. The term "Identity Module" as used herein refers to ant type of electronic module (e.g., a smartcard) that contains a globally unique identifier (frequently termed an International Mobile Subscriber Identity) that uniquely identifies the Identity Module, and which enables a wireless device to which it is attached to communicate with wireless communication networks throughout the world. A more detailed discussion of examples and operation of an Identity Module is contained in commonly-owned, copending U.S. patent application Ser. No. 10/886,005, entitled "SYSTEM AND METHOD FOR OVER THE AIR (OTA) WIRELESS DEVICE AND NETWORK MANAGEMENT" and filed on Jul. 7, 2004, which is herein incorporated by reference in its entirety. For the sake of simplicity, the following discussion with refer to the device agent as being located on the device. However, it is to be appreciated that the device agent may also be located on an Identity Module, or similar electronic module, that is coupled to the device.

Referring to FIG. 1, there is illustrated a block diagram of one embodiment of a system according to the invention. The system may include a device 100 that may be able to communicate with a management server 102 over a communication network 104. In many embodiments, the device may be a wireless device and the communication network 104 may include a wireless link between the device 100 and the management server 102. However, it is to be appreciated that the invention is not limited to wireless devices and wireless network links Rather, the communication network may include any suitable transmission media by which the device 100 may communicate with the server 102 including, but not limited to, copper wiring, optical fiber network links, electromagnetic radiation, etc. A device agent 106 may be loaded on the device 100. The device agent 106 may receive messages from the management server 102 over network channel 108 and may send status updates to the management sever via network channel 110, as discussed further below. In response to messages received from the management server 102, the device agent 106 may install one or more traps 112 on the device, as discussed below. It is to be appreciated that although the device 100 is illustrated as a cell phone in FIG. 1, the invention is not so limited, and the principles of the invention may be applied to any type of device, including, for example, a PDA, a personal computer, and other devices. In addition, although network channels 108 and 110 are illustrated as being separate channels, the invention is not so limited and communication between the device agent and the management server may be over a single channel in some embodiments.

According to one embodiment, the management server 102 may communicate with the device agent 106 to establish a mechanism by which the device capability may be altered (e.g., turned on or off) in response to the execution of previously set traps. To set up these traps, the management server 102 may send a link command to the device agent via network channel 108. The link command may specify the conditions under which various device capabilities should be altered. In one embodiment, the link command may include two components. First, the link command may include a trap component that may specify the details of the type of trap to be installed on the device, including conditions that may trigger the trap. Second, the link command may include an action component that may specify the action to be taken regarding enabling or disabling capabilities of the device. The action portion may specify a single change, a series of changes, or various combinations of changes that are to be made to the device functionality. For example, execution of one trap may result in only the ringer of a cell phone being turned off. In another example, execution of one trap may result in all wireless capability of a PDA or laptop computer to be disabled. Thus, the device agent may parse the link command and determine the traps to be set and the device capability to be linked to the traps.

Figure 2:
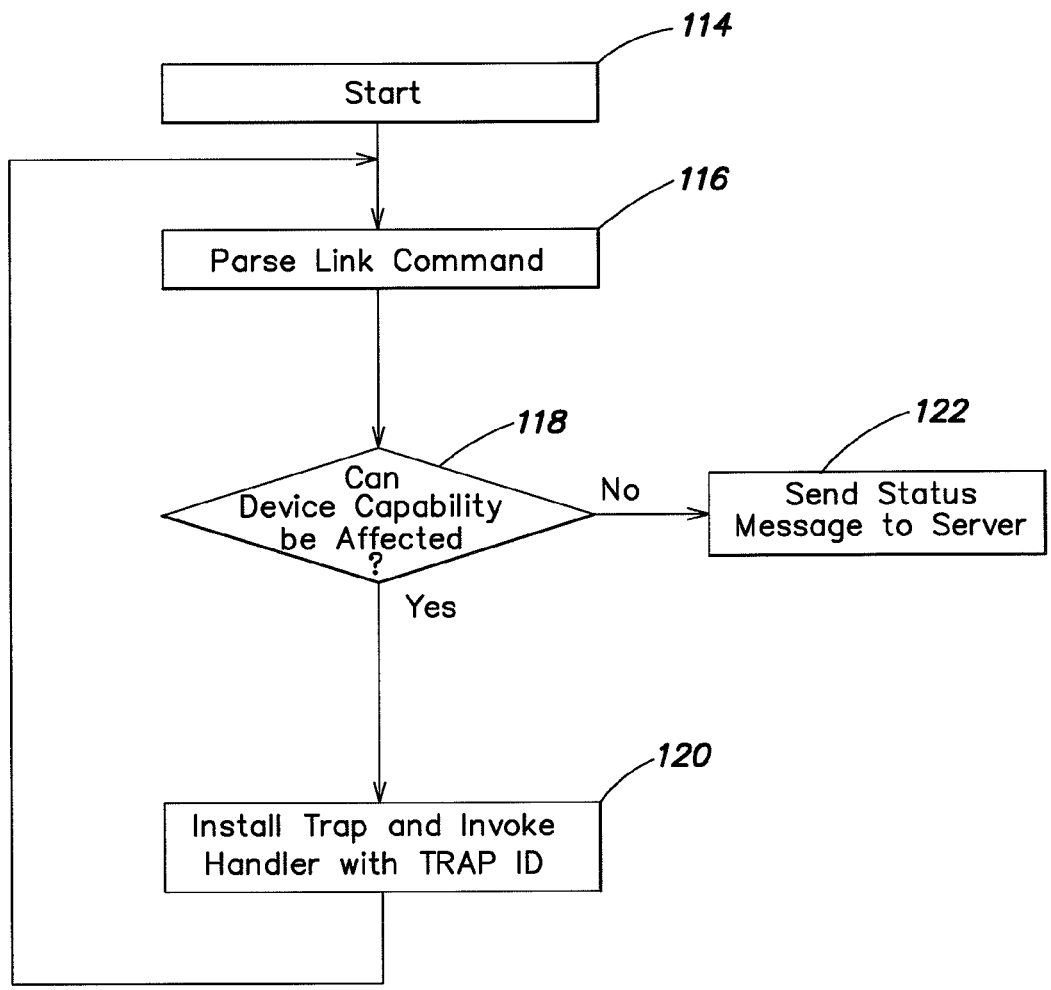
FIG. 2 is a flow chart illustrating one example of a method of remote device control according to aspects of the invention.

Referring to FIG. 2, there is illustrated a flow diagram illustrating one example of a method of remotely altering device functionality according to an embodiment of the invention. As discussed above, in a first step 114, a link command may be sent to the device agent by the management server and the device agent may accept the link command. This step may also include validation of the link command by the device agent before acceptance of the link command. In at least one embodiment, linking of condition detection to device capability may be allowed only upon a request from a trusted management server. Without such a restriction, any action, even that from a malicious source, may be able to alter the capabilities of the device, which preferably should be avoided. Therefore, the device agent may accept the link command only after authenticating the management server. This authentication may be done, for example, using a signature or identity code. The device agent may be programmed with one or more unique identity codes or signatures that identify trusted management servers from which the device agent may accept link commands. The code or signature may then accompany the link command to allow the device agent to recognize that the link command comes from a trusted management server. If the device agent cannot verify the link command, it may not accept the link command so as to prevent unauthorized sources from altering device functionality.

Referring again to FIG. 2, the device agent may parse the link command in a second step 116 to determine the trap(s) to be set and the device functionality to be altered. In one embodiment, a translation or lookup table may be maintained that may provide a mapping between the condition specified in the link command and the identity of the device software modules that can change the specified device functionality. In some cases, there may be many ways to change device functionality. Therefore, in one embodiment, the device agent may register all software modules on the device that have the ability to change any device functionality. The identity of these software modules may then be stored in the translation table to enable the device agent to properly link a given trap with the appropriate software module to effect the desired change in device functionality. The device agent may access the translation table to determine which device software module may be activated upon execution of a specific trap. For example, assuming the device is a cell phone, if the link command specifies that when the cell phone enters a movie theatre it is to be switched to silent mode (e.g., the ringer is to be disabled), then the device agent may use the translation table to look up which device software module controls the ringer. The device agent may then link that software module to the trap, such that when the trap executes (i.e., the cell phone enters a movie theatre), the ringer may be disabled.

Referring again to FIG. 2, after parsing the link command to determine what device functionality is to be affected upon execution of a given trap, the device agent may determine if the action part of the link command can be executed. In other words, in step 118, the device agent may review the translation table to determine whether there are registered in the translation table software modules having the capability to change the specified device functionality. If no such software modules are present, then a status message may be sent to the management server (step 122). If at least one appropriate software module is registered, then the device agent may install the trap and the link the trap to the software module(s) in step 120.

According to one embodiment, a trap handler may be associated with each software module having the ability to alter device functionality. The handler may implement a mechanism to disable or enable one or multiple components to achieve the desired change in device functionality. Each trap handler may be associated with a handler signature. In one embodiment, this handler signature may be stored in the translation table such that the device agent can look up, based on a desired functionality change, the appropriate handler that is to be invoked. Thus, the translation table may be used to convert the capability to be affected to an appropriate trap handler that implements the ability to change the capability of the device. In one embodiment, each trap may be given a trap identity (trap ID). The device agent may provide this trap ID to each appropriate trap handler. In some circumstances, a given condition may trigger multiple traps, or a given trap may affect multiple device functions. These cases may be automatically accounted for by providing each trap ID to each appropriate trap handler. Thus, the trap can specify the device components (e.g., Bluetooth, camera, keyboard, etc.) that are to be disabled and, when the trap executes, the trap handlers that have been linked to the trap ID may invoke the corresponding software modules to achieve the desired result. This may occur automatically, without reliance on a device user.

Once a trap has executed and certain device capabilities have been disabled, there may be several ways to re-enable the device capabilities. In one embodiment, device capability may be restored automatically when the condition for the trap execution is cleared or reset. In another embodiment, device capability may be restored via a command from the management server. In this embodiment, the management server may send another link command to the device agent that specifies the conditions under which certain capabilities may be restored. Again, the translation scheme discussed above may be used to link the capability specified in the action portion of the link command to appropriate software modules to achieve the desired re-enablement. In one example, the device functionality may be restored only after mutual authentication between the device agent and the management server. For example, the management server may compare a signature (or code) sent from the device agent with a stored list of device signatures to authenticate the device, and the device agent may similarly compare a signature (or code) sent by the management server to verify that the management server is a trusted source, as discussed above.

According to another embodiment, the linking of traps to device capability may be used in combination with anti-virus software installed on the device to automatically establish a quarantine on a device infected with a virus or spyware. Anti-virus software can detect the presence of a virus or spyware. In one embodiment, a link command from the management server, as discussed above, may be used to link the detection of a virus by anti-virus software to the execution of a trap that may establish a quarantine on the device by disabling some or all capabilities of the device. For example, communication to or from the device may be disabled once a virus or spyware is detected to prevent spreading of the virus or distribution of personal data by the spyware. It is to be appreciated that although the following discussion may primarily refer to virus detection and counter measures, the principles of the invention also apply to detection and management of spyware and other potentially damaging or invasive software programs.

Figure 3:
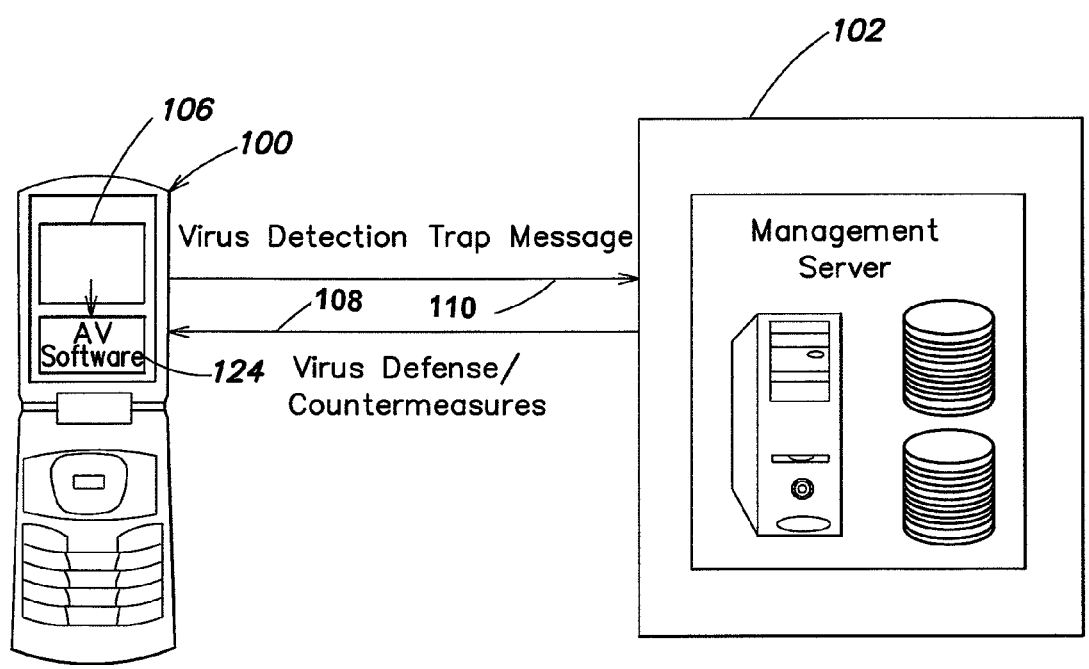
FIG. 3 is a block diagram of one example of system according to another embodiment of the invention.

Referring to FIG. 3, there is illustrated a block diagram of one example of a system that may provide enhanced anti-virus counter measures on a device. As discussed above, a management server 102 may communicate with a device agent 106 installed on (or in communication with) a device 100. In one embodiment, this system may implement a mechanism to set a trap on the device 100 for virus detection using anti-virus software 124. For example, the management server may send a link command to the device agent to set up a trap that executes upon detection of a virus by the anti-virus software 124 (i.e., the condition that triggers the trap is detection of a virus). In one embodiment, the actions to establish the quarantine may be specified in the action portion of the link command. For example, when a virus is detected by the anti-virus software 124, the device may execute a trap. A trap handler may then invoke appropriate device software modules (as discussed above) to disable or enable specified device functionality to quarantine the device. In this manner, the device quarantine may be established automatically upon execution of the trap.

In another embodiment, when the trap executes, the device agent may send a message to the management server (via network channel 110) to indicate to the management server which programs of data on the device have been infected. The management server may then issue commands to the device agent (via network channel 108) to quarantine the device. In one example, these commands may be issued according to a set virus management policy, as discussed below. The device agent may receive the commands from the management server and communicate with one or more software modules on the device to implement the desired action.

The quarantine may be enforced in several different ways. For example, the device may be "locked" (i.e., all input to the device may be prevented), or the infected programs/data may be isolated. In another example, the device may be prevented from sending any communications so as to prevent spreading of the virus or infected data or, in the case of spyware, to prevent unauthorized distribution of private data from the device. In another example, infected programs/data may be "scrubbed" to remove the virus or prevent damage from occurring. A quarantine may also include combinations of these and other actions that may be defined as per a policy set up in the device agent or the management server. It should be noted that in any event, the quarantine may be automatically defined and implemented by the system without requiring action on the part of a user of the device.

In order to reliably detect viruses on a device, anti-virus software may be installed on the device and may be periodically updated for new virus threats. According to one embodiment, the management server 102, in combination with the device agent 106, may have the ability to provide the device 100 with remote (e.g., over the air for wireless devices) virus counter measures, including remote distribution of anti-virus software, configuration of anti-virus policies, prioritized updating of virus definitions based on these policies, and removal or cleaning of infected device software. For example, the device agent 106 may scan applications on the device to determine whether anti-virus software is installed. This scanning may be done periodically or upon request from the management server or from a user. If not, the device agent may alert the management server via network channel 110. The management server may act as a conduit to download anti-virus software from a provider to the device. Once the anti-virus software is installed, the management server may check the configuration parameters of the anti-virus software and may set parameters, policies and virus definitions. The management server may also check the device for current virus definitions and provide updated definitions as needed. This checking may be user-initiated or management server-initiated.

In one embodiment, automatic checking of virus definitions and installation of counter measures may be done in accordance with a set policy. Policy rules set on the device may allow for automatic checking of virus definitions together with downloading of virus protection code (e.g., updated virus definitions or new anti-virus software). In addition, the policy rules may define actions to be taken by the management server upon detection and reporting of a virus infection on the device, as discussed above. The policy may be defined, for example, by a service provider or in accordance with vendor-provided anti-virus software.

In summary, according to aspects and embodiments of the invention, a management server and a device agent loaded on, or in communication with, a device may implement a mechanism to automatically change the capability of a device in response to various conditions or circumstances. Link commands sent from the management server to the device agent may provide an association between the condition and the action to be taken on the device. Upon verification that the link command comes from a trusted source, the device agent may implement this association by setting software traps which, when executed in response to occurrence of the condition, alter specific capabilities or functionality of the device. Once the traps are set and linked to the desired device capability, occurrence of the conditions that trigger the trap(s) may automatically result in changed device functionality, without reliance on a user.

Having thus described several aspects and embodiments of the invention, modifications and/or improvements may be apparent to those skilled in the art and are intended to be part of this disclosure. It is to be appreciated that the principles of the invention may be applied to many different circumstances and many different devices, not limited to the examples given herein. The above description is therefore by way of example only, and includes any modifications and improvements that may be apparent to one of skill in the art. The scope of the invention should be determined from proper construction of the appended claims and their equivalents.

What is claimed is:

1. A method of automatically altering functionality of a wireless device in response to occurrence of a condition, the method comprising acts of:
   receiving a link command that specifies the condition and the functionality of the wireless device to be altered;
   determining, responsive to receipt of the link command, whether a device software module of a plurality of device software modules installed on the wireless device is capable of altering the functionality of the wireless device;
   determining, responsive to a determination that a device software module of the plurality of device software modules is installed on the wireless device that is capable of altering the functionality of the wireless device, an identifier of the device software module installed on the wireless device that is capable of altering the functionality of the wireless device;
   installing a software trap on the wireless device, the software trap being configured to transfer control to the device software module that is capable of altering the functionality of the wireless device;
   linking, on the wireless device, an identifier of the software trap to the identifier of the device software module capable of altering the functionality of the wireless device;
   detecting, on the wireless device and subsequent to the acts of installing and linking, the occurrence of the condition; and
   executing the software trap on the wireless device solely in response to the act of detecting to automatically alter the functionality of the wireless device without any input from a user of the wireless device;
   wherein occurrence of the condition includes detection of a virus on the wireless device; and
   wherein altering the functionality of the wireless device includes establishing a quarantine on the wireless device.

2. The method as claimed in claim 1, wherein altering the functionality of the wireless device includes disabling access to at least one hardware resource of the wireless device.

3. The method as claimed in claim 1, further comprising authenticating the link command on the wireless device to verify that the link command is received from a trusted source prior to the acts of installing and linking.

4. The method as claimed in claim 3, wherein authenticating the link command includes comparing a signature accompanying the link command with a stored signature corresponding to the trusted source.

5. The method as claimed in claim 1, wherein establishing a quarantine includes at least one of disabling inputs to the wireless device, disabling outputs from the wireless device, isolating infected programs on the wireless device and scrubbing wireless device software.

6. A system for automatically altering specified functionality of a wireless device in response to occurrence of a condition, the system comprising:
   a device agent installed on the wireless device;

a plurality of device software modules installed on the wireless device, each of the plurality of device software modules being capable of altering functionality of the wireless device; and a software trap installed on the wireless device and configured to transfer control to at least one of the plurality of device software modules solely in response to detection of the occurrence of the condition by the wireless device;

anti-virus software installed on the wireless device;

wherein the device agent is constructed and arranged to:

receive a link command that identifies the condition and the specified functionality of the wireless device to be altered in response to occurrence of the condition;

determine, responsive to receipt of the link command, whether a device software module of the plurality of device software modules is capable of altering the specified functionality of the wireless device;

determine, responsive to a determination that a device software module of the plurality of device software module is installed on the wireless device that is capable of altering the specified functionality of the wireless device, an identifier of the device software module installed on the wireless device that is capable of altering the specified functionality of the wireless device; and link, on the wireless device, the identifier of the device software module that is installed on the wireless device and capable of altering the specified functionality of the wireless device to an identifier of the trap so that execution of the trap automatically alters the specified functionality of the wireless device without any input from a user of the wireless device;

wherein the condition includes detection of a virus by the anti-virus software.

7. The system as claimed in claim 6, wherein the specified functionality of the wireless device includes access to at least one hardware resource of the wireless device.

8. The system as claimed in claim 6, further comprising a management server constructed and arranged to supply the link command to the device agent.

9. The system as claimed in claim 6, wherein the device agent is constructed and arranged to send a message to the management server upon execution of the trap in response to the detection of the virus; and wherein the message includes an indication of device software that has been infected by the virus.

10. The system as claimed in claim 6, wherein the device agent is further constructed and arranged to authenticate the link command on the wireless device to verify that the link command is received from a trusted source prior to linking the identifier of the device software module to the identifier of the trap.

11. The system as claimed in claim 6, wherein the wireless device is a mobile wireless device.

12. A system for automatically altering specified functionality of a wireless device in response to occurrence of a condition, the system comprising:

a plurality of device software modules installed on the wireless device, each of the plurality of device software modules being capable of altering functionality of the wireless device;

a software trap installed on the wireless device and configured to transfer control to at least one of the plurality of device software modules solely in response to detection of the occurrence of the condition by the wireless device;

anti-virus software installed on the wireless device;

means, installed on the wireless device, for receiving a link command that identifies the condition and the specified functionality of the wireless device to be altered in response to occurrence of the condition, for determining, responsive to receipt of the link command, whether a device software module of the plurality of device software modules is capable of altering the specified functionality of the wireless device, for determining, responsive to a determination that a device software module of the plurality of device software module is installed on the wireless device that is capable of altering the specified functionality of the wireless device, an identifier of the device software module installed on the wireless device that is capable of altering the specified functionality of the wireless device, and for linking the identifier of the device software module that is installed on the wireless device and capable of altering the specified functionality of the wireless device to an identifier of the trap on the wireless device-so that execution of the trap automatically alters the specified functionality of the wireless device without any input from a user of the wireless device;

wherein the condition includes detection of a virus by the anti-virus software.

13. The system as claimed in claim 12, wherein the wireless device is a mobile wireless device.

* * * * *